Feb. 28, 1956 A. F. PARMELEE 2,736,027

PIVOT MOUNTING FOR WELDER'S FACE SHIELD

Filed Nov. 26, 1951

INVENTOR.
Alfred F. Parmelee

BY [signature]

ATTORNEY.

United States Patent Office 2,736,027

Patented Feb. 28, 1956

2,736,027

PIVOT MOUNTING FOR WELDER'S FACE SHIELD

Alfred F. Parmelee, Kansas City, Mo., assignor to Parmelee Plastics Company, Kansas City, Mo., a corporation of Missouri Application November 26, 1951, Serial No. 258,217

1 Claim. (Cl. 2—8)

This invention relates to improvements in welder's face shields and like protective devices wherein is provided a guard member that is advantageously mounted for swinging movement to and from an operating position.

It is the most important object of the present invention to provide improvements in devices of the aforesaid character by means of a novel pivotal arrangement to swingably interconnect the face shield and a head band and including a pair of relatively rotatable, identical discs having stubs for limiting the extent of swinging movement of the shield relative to the band.

Another important object hereof is to provide a pivotal hinge including a pair of plates that may be of identical character for ease and simplicity of manufacture, each disc having stops thereon to limit the extent of swinging movement of the band and each disc being provided with a plurality of abutments for yieldably holding the shield in a number of positions, all through the provision of a yieldable bias of the discs themselves toward each other.

Other objects include the way in which the aforesaid stops of the discs are stamped therefrom; the way in which the abutments are provided at the peripheries of the discs also by an inexpensive stamping operation; the manner of providing a pivotal connection between the discs through a suitable pin; the way in which the discs themselvse are fastened without need of auxiliary connecting elements; and the manner of adjustably mounting the shield with respect to the discs themselves.

Figures 1, 2, 5, 6:
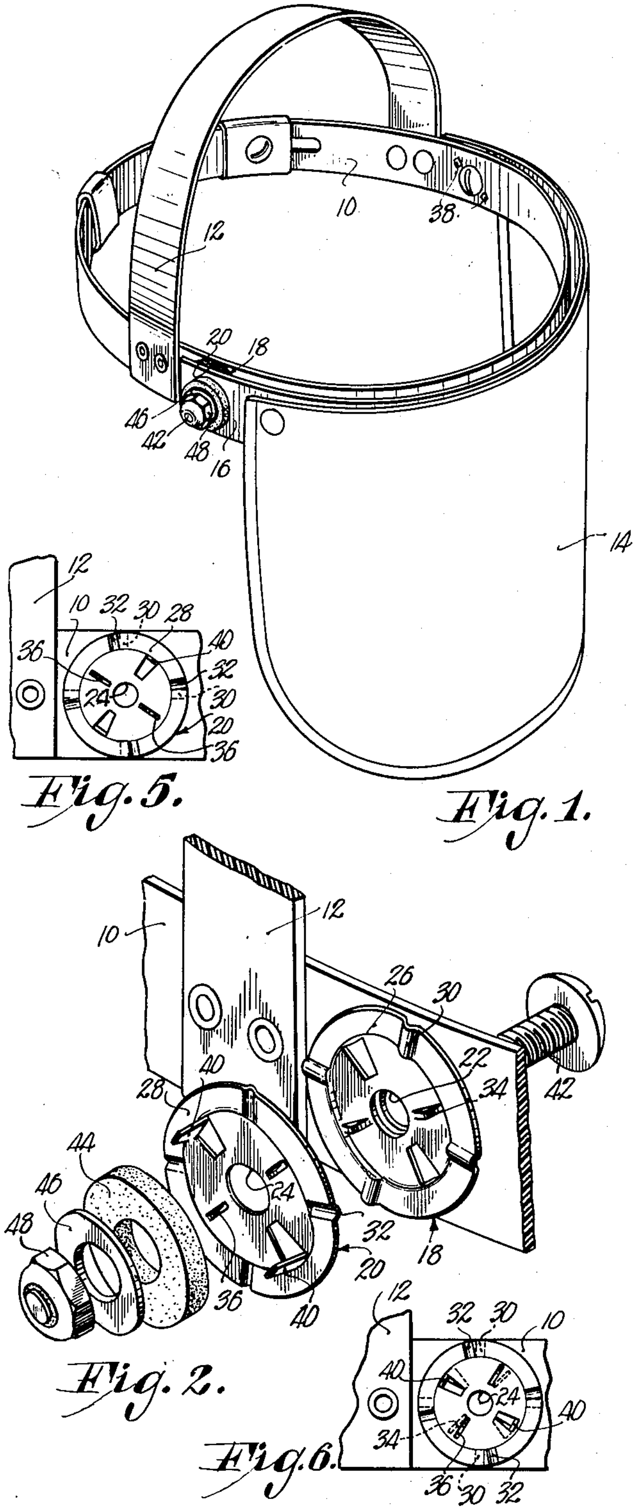
Figure 1 is a front and top perspective view of a welder's face shield showing a pivotal mounting therefor made pursuant to the present invention.
Fig. 2 is an enlarged, fragmentary, stretched-out, perspective view of one of the pivotal mountings.
Fig. 5 is an elevational view of the outermost disc of one of the pivot mountings showing the relative positions of the discs when the welder's shield is turned up.
Fig. 6 is a view similar to Fig. 5 illustrating the relative positions of the discs when the shield is in front of the eyes of the wearer.

The article of wear chosen for illustration and shown particularly in Fig. 1 of the drawing, includes an adjustable head band 10 having a strap 12 secured thereto, and a shield 14 that is secured in any suitable manner to a shield band 16.

Pursuant to the present invention, a pair of pivotal mountings is provided in diametrically opposed relationship on the band 10 to swingably join the shield 14 to band 10. The pivotal mountings are identical and therefore, only one will be described.

A pair of preferably circular discs 18 and 20 of identical character, may be stamped or otherwise formed from a single sheet of metallic material or other suitable substance. Discs 18 and 20 are provided with central perforations 22 and 24, raised marginal edges 26 and 28, a plurality of abutments 30 and 32 in the marginal edges 26 and 28, and a pair of diametrically opposed stops 34 and 36 respectively. The abutments 30 and 32, as well as the stops 34 and 36, are all preferably radial with respect to the axis of openings 22 and 24 respectively and, the abutments 30 all face the abutments 32. Likewise, the two stops 34 of disc 18 extend radially outwardly from the opening 22 and the stops 36 are similarly formed in the disc 20.

The disc 18 has a pair of diametrically opposed ears 38 stamped therefrom and passing through the band 10, whence they are turned inwardly as shown in Fig. 1, to rigidly join the disc 18 to the band 10. The disc 20 likewise has a pair of ears 40 stamped therefrom and passing through the shield band 16 for clamping the disc 20 to the band 16.

Figure 3:
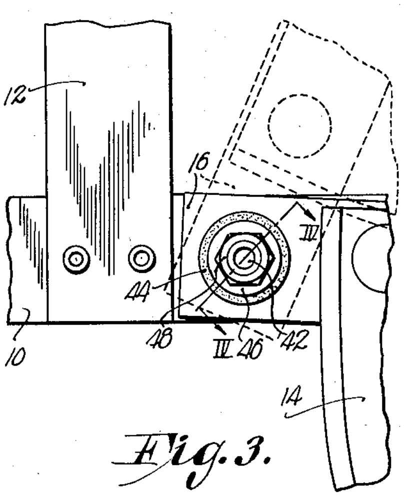
Fig. 3 is an enlarged, side elevational view of one of the pivotal mountings.
Figure 4:
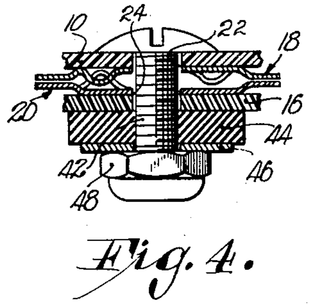
Fig. 4 is a fragmentary, detailed, cross-sectional view taken on line IV—IV of Fig. 3 looking in the direction of the arrows.

Bolt 42 receives a resilient washer 44, a non-resilient washer 46, and a nut 48 preferably of the self-locking type, the washers 44 and 46 and the nut 48, all being disposed exteriorly of the shield band 16. The resilient washer 44 yieldably holds the abutments 32 of disc 20 in sliding engagement with the marginal edge 26 of disc 18 and the abutments 30 of disc 18 in sliding engagement with the marginal edge 28 of disc 20. When the shield 14 is in the operative position illustrated in Fig. 1 of the drawing, i. e. the position shown in full lines by Fig. 3, the stops 36 are moved to a position engaging the stops 34. Likewise, all of the abutments 32 are on one side of the abutments 30 in engagement with the latter as shown in Fig. 6 of the drawing. When the shield 14 is swung from the position shown in Fig. 1 of the drawing to the position illustrated by dotted lines in Fig. 3 of the drawing, abutments 32 are moved from the position shown in Fig. 6 to the position shown in Fig. 5. By virtue of the yielding action of resilient washer 44, the abutments 32 are moved past and over the abutments 30 to rest upon the opposite side of the abutments 30. In the event that the shield 14 is swung rearwardly beyond the position shown in dotted lines in Fig. 3, the stops 34 and 36 again come into interengagement to limit the extent of swinging movement of the shield 14 relative to band 10.

Figure 7:
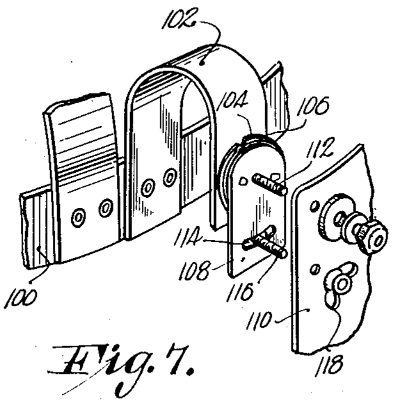
Fig. 7 is a fragmentary, stretched-out, perspective view of a slightly modified form of pivotal mounting.

In the modification of Fig. 7, a head band 100 is provided with a pair of U-shaped members, one only of which is shown in Fig. 7 and designated by the numeral 102. A pair of discs 104 and 106 identical with discs 18 and 20, are connected to the member 102 and to a plate 108 respectively. Shield 110 receives pivot pin 112, comparable to pivot pin 42, that passes through the member 102, discs 104 and 106, plate 108 and shield 110. Plate 108 has an arcuate slot 114 therein concentric with the pivotal axis 112 for receiving a bolt 116 that passes through the shield 110 and has a wing nut or the like 118 thereon.

It is seen that the pivotal mounting including discs 104 and 106, is the same in Fig. 7 as above described with respect to the modification of Figs. 1 to 6 inclusive. Additionally however, the shield 110 may be adjusted relative to the plate 108 by merely releasing the wing nut 118 and swinging shield 110 on pivot pin 112 to the desired position.

It is now apparent that among the advantageous features of the pivot mounting hereinabove set forth, is the identity of the discs 18 and 20 or 104 and 106 as the case may be, the complete elimination of separate fastening elements to secure the discs to their respective parts, together with the provision of the plurality of stops and abutments for limiting the extent of swinging movement of the shield and holding the same in predetermined positions, all by means of the simple and inexpensive expedient of a single stamping operation.

Details of construction may vary from those specifically set forth herein without departing from the spirit of this invention and it is, therefore, desired to be limited only by the scope of the appended claim.

Having thus described the invention what is claimed as new and desired to be secured by Letters Patent is:

In combination with a welder's face shield, a headband and a U-shaped member mounted on the headband, a hinge between the shield and said member comprising a pair of identical discs; pivot means mounting the discs for rotation on a common axis, said shield being swingable on the pivot means; resilient means mounted on said pivot means and yieldably holding the discs biased together, each disc being provided with a central depressed portion and an annular, raised marginal edge at the periphery thereof concentric with said axis and surrounding the depression, presenting a chamber between the discs; two pairs of diametrically opposed, equally spaced, radial abutments on said edge of each disc respectively, the abutments of each disc extending toward the opposite disc; a pair of diametrically opposed radial stops on the proximal faces of each depressed portion respectively and within the chamber, the radial disposition of the stops being offset relative to the radial disposition of the abutments whereby, upon relative rotation of the discs, the abutments releasably limit the extent of relative rotation of the discs between the stops and the latter positively limit the extent of relative rotation of the discs; a plate between the discs and the shield; means attaching one of the discs to the member and the other disc to the plate including ears extending outwardly from the depressed portions of each disc respectively; and releasable take-up means spaced from said pivot means and extending through the plate and the shield for holding the latter against swinging movement on the pivot means relative to the plate, said plate having an arcuate slot concentric with the pivot means and receiving the take-up means, permitting adjustment of the shield relative to the plate upon release of the take-up means.

References Cited in the file of this patent

UNITED STATES PATENTS

| | | |
|---|---|---|
| 1,416,656 | Lyman | May 16, 1922 |
| 2,461,604 | Huntsman | Feb. 15, 1949 |
| 2,488,305 | Manger et al. | Nov. 15, 1949 |
| 2,545,843 | Cohan | Mar. 20, 1951 |

FOREIGN PATENTS

| | | |
|---|---|---|
| 573,130 | Great Britain | Nov. 7, 1945 |